United States Patent
Lin et al.

(10) Patent No.: US 7,600,601 B2
(45) Date of Patent: Oct. 13, 2009

(54) TUNABLE MASS DAMPER FOR A DRIVE SHAFT CENTER SUPPORT BEARING

(75) Inventors: Steve X. Lin, Northville, MI (US); Carlos F. Osorio, Novi, MI (US); Nitin Y. Wani, Farmington Hills, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 361 days.

(21) Appl. No.: 11/711,312

(22) Filed: Feb. 27, 2007

(65) Prior Publication Data
US 2008/0205809 A1    Aug. 28, 2008

(51) Int. Cl.
*B60K 17/24*    (2006.01)
(52) U.S. Cl. ....................................... 180/381
(58) Field of Classification Search ............... 180/381, 180/382; 267/276–282, 292, 293; 464/180; 188/378, 379
See application file for complete search history.

(56) References Cited

U.S. PATENT DOCUMENTS

| | | | |
|---|---|---|---|
| 3,037,573 A | * | 6/1962 | Larsen ........................ 180/381 |
| 5,145,025 A | | 9/1992 | Damian |
| 6,422,947 B1 | | 7/2002 | Kelly et al. |
| 6,817,771 B2 | | 11/2004 | Campbell |
| 6,869,226 B2 | | 3/2005 | Henkel et al. |

FOREIGN PATENT DOCUMENTS

| | | |
|---|---|---|
| DE | 2610212 A1 | 9/1977 |
| JP | 2154826 A | 12/1988 |
| KR | 20040039733 A | 11/2002 |

\* cited by examiner

*Primary Examiner*—Paul N Dickson
*Assistant Examiner*—Robert A Coker
(74) *Attorney, Agent, or Firm*—MacMillan, Sobanski, & Todd, LLC

(57) ABSTRACT

A mass damper for use with a drive shaft center support bearing is located on a non-rotating portion of the bearing and is suspended on a spring element for free vibration and has a resonance that is selected to be the same as that which would otherwise be communicated to the vehicle through the bearing by the drive shaft and drivetrain components. The two embodiments are each tunable so that the damper can be set to have different resonant vibration characteristics, as required for use with different drive shaft and drivetrain configurations.

20 Claims, 3 Drawing Sheets

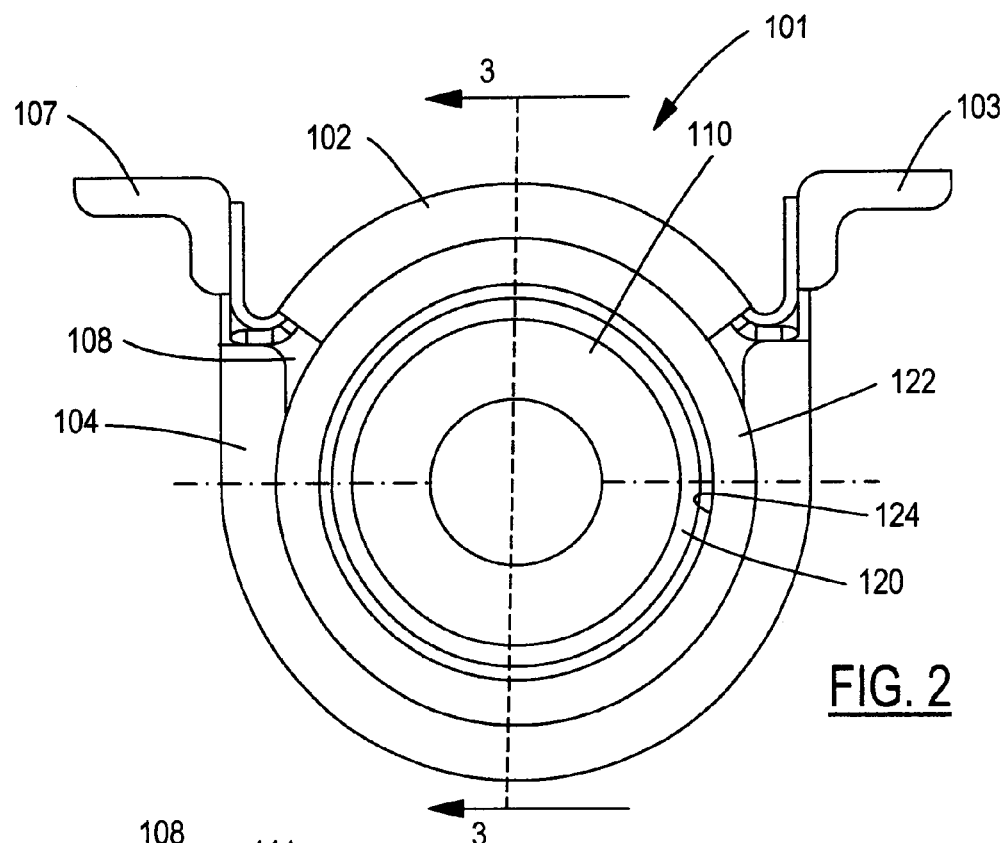
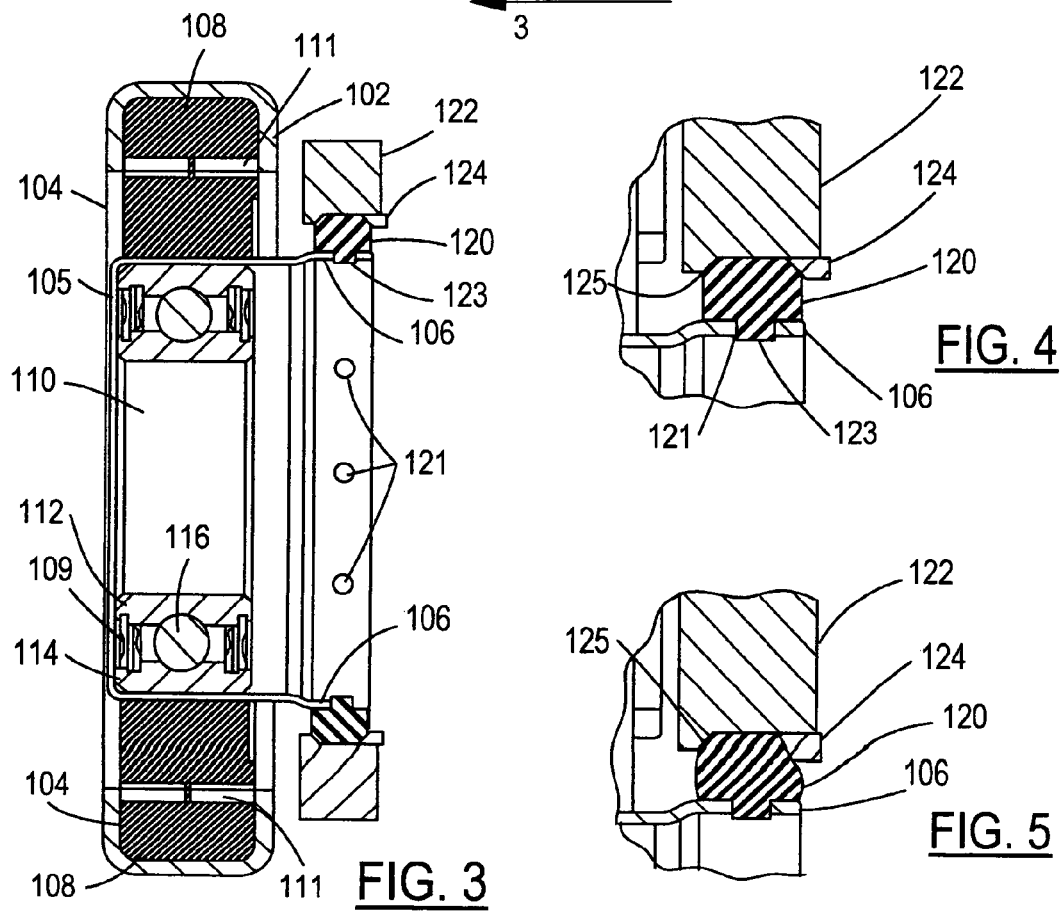

TUNABLE MASS DAMPER FOR A DRIVE SHAFT CENTER SUPPORT BEARING

BACKGROUND OF THE INVENTION

The invention relates generally to the field of vibration isolation in automotive vehicles and more particularly to the area of minimizing the effects of drive shaft vibration resonance.

DESCRIPTION OF THE PRIOR ART

In general, a multi-piece driveshaft requires a support bearing near where the shafts are joined together. The support bearing is also called a drive shaft center support bearing because it is near the center or the junction between a pair of drive shafts. The support bearing usually includes a roller bearing isolated in rubber, and a bracket configuration used as a point of attachment to the vehicle structure. For automotive applications, whether it is attached directly to the vehicle body or to the vehicle frame, the support bearing is the key element for conveying vibration caused by an imbalances in the drive shafts and is the element that has been altered many ways in order to reduce the effect of such vibrations.

U.S. Pat. No. 6,422,947 describes a driveshaft bearing in which the conventional bearing assembly is mounted in a bracket but separated therefrom by a flexible rubber support member. It is known that such support functions to isolate and reduce the transfer of vibrations from the rotating shaft to the vehicle.

It is further known that merely isolating the bearing does not completely attenuate the shaft vibrations when they enter into a resonant mode of vibration, typically in the range of 22 Hz~26 Hz. Vibrations from the resonant mode are significantly higher in intensity and are often felt by the vehicle occupants. When the vehicle shaft rotates through this frequency range it sometimes causes a shudder type disturbance. This disturbance is not only speed sensitive, but also torque sensitive and sensitive to rear suspension jounce.

U.S. Pat. No. 5,145,025 describes a non-rotating vibration damper for a drive shaft in which an absorber mass is connected via a spring directly to a coaxially arranged ring that is fixed directly to the outer ball bearing race. The vibration damper is described as freely vibrating and as being adjusted to the respective natural frequency of the drive shaft for the purpose of reducing the "bending" vibrations that occur.

Although this patent describes a damper that may be adjusted, there is no described mechanism for such adjustment. Therefore, once that vibration damper is designed and built for a particular powertrain configuration, it is dedicated to that configuration or another which exhibits the same resonance frequency in drive shaft vibrations.

SUMMARY OF INVENTION

The present invention utilizes the principle of employing a sprung mass inertia on a drive shaft bearing to create and apply an opposing force to a vibrating component that counteracts and thereby inhibits or significantly reduces the vibration from a drive shaft whenever it occurs. In addition, the present invention provides a vibration damper which is tunable so that the same components can be utilized with a variety of powertrain configurations which exhibit different resonant frequency vibrations.

Many different drive train combinations of drive shafts, engines, transmissions and differentials result in many different resonant vibration frequencies that require damping by the present invention. While it is feasible to design a different damper assembly made up of differing spring and/or mass elements for each desired application, it is more desireable to have a tunable damper which can be used in a wide variety of applications. Therefore, the presention invention includes means for selectively presetting the compression forces on the spring element and/or altering the mass element to thereby tune the damper assembly.

Two embodiments of the present invention are described which illustrate tunable vibration damping for reducing the effects of drive shaft vibration in its resonant mode. In general, this is achieved by providing a non-rotatable vibration isolator on the support bearing that counteracts the vibrational effects otherwise introduced by the drive shaft. Each embodiment utilizes a mass element symmetrically supported for free vibration on a spring element. The spring element is supported on a non-rotating portion of the drive shaft bearing.

In the first embodiment, the spring element is in the form of an elastomer of a predetermined size and thickness attached to a collar which extends from the non-rotating portion of the bearing. The mass element is in the form of a cylindrical ring with a central aperture sized to fit over the spring element so as to be held thereon and allowed to freely vibrate. Tuning of the damper assembly is provided by employing an associated tuning ring that is press fitted into the central aperture of the mass element and adjacent the spring element. In order to set the resonant frequency of vibration of the mass damper to match that of a particular driveshaft and powertrain configuration, the tuning ring is axially adjusted towards the spring element to cause it to be further compressed and have altered spring characteristics.

In the second embodiment, the spring element is in the form of an elastomer that is located between the non-rotating collar and the mass element. The mass element is made up of several arcuate sections configured to be clamped together and onto the spring element and collar by fasteners. The sections of the mass element are adapted to allow the attachment of additional added mass elements to change the resonant vibration frequency of the mass damper assembly. Additional tuning is provided by controlling the torque applied to the fasteners when attaching the segments together, since the amount of tighteninig directly effects the compression forces present on the spring elements. Further tuning is provided by employing segmented spring elements that have different spring characteristics with opposing mass element sections. In this manner, the mass damper assembly can provide damping when it is necessary to oppose the effects of vibrations occurring at separate resonant frequencies and in orthogonal directions transverse to the axis of the bearing.

It is an object of the present invention to provide a vibration damper assembly for use with a drive shaft bearing in an automotive vehicle which employs a plurality of drive shafts connected together for rotation about their respective axis adjacent to the bearing. The drive shaft bearing supports the drive shafts on the vehicle and includes a bearing housing that is connectable to the vehicle, an immovable outer race element connected to the housing, an inner race element and a plurality of rotatable bearings captured between the inner and outer races. A non-rotating cylindrical collar is connected to the outer race and extends co-axially therefrom and spaced from contact with the shaft. The damper mass assembly includes a circular spring element mounted on the collar extension and a mass element suspended on the collar by the spring element to provide counteracting forces to vibrations induced by a mounted drive shaft while it is rotating within the inner race. The assembly also includes means for selectively presetting or adjusting the compression forces present on the spring element in order to tune the damper assembly to a predetermined resonant frequency of vibration characteristic.

It is another object of the present invention to provide a tuning mechanism that comprises an annular ring that is adjacent to the spring element and is press fitted in the mass element to a degree that alters the compression forces present on the spring element and thereby tune the damper assembly to a predetermined resonant frequency of vibration characteristic.

It is a further object of the present invention to provide a mass element that is adjustable to alter the compression forces on the spring element and thereby tune the damper assembly to a predetermined resonant frequency of vibration characteristic.

It is a still further object of the present invention to provide a mass element that accepts additional mass elements for attachment and thereby tune the damper assembly to a predetermined resonant frequency of vibration characteristic.

BRIEF DESCRIPTION OF THE DRAWINGS

FIG. 2 is a plan view representation of a drive shaft support bearing containing a first embodiment of the present invention.

FIG. 3 is a cross-sectional view representation of the drive shaft support bearing taken along section lines 3-3 in FIG. 2.

FIG. 4 is an enlarged view representation of the mass element, spring element and tuning element of the first embodiment represented in FIG. 3.

FIG. 5 is another enlarged view of the mass element, spring element and tuning ring of the first embodiment represented in FIGS. 3 and 4 adjusted to alter the resonant frequency of vibration of the damper assembly.

DETAILED DESCRIPTION OF THE INVENTION

Figure 1:
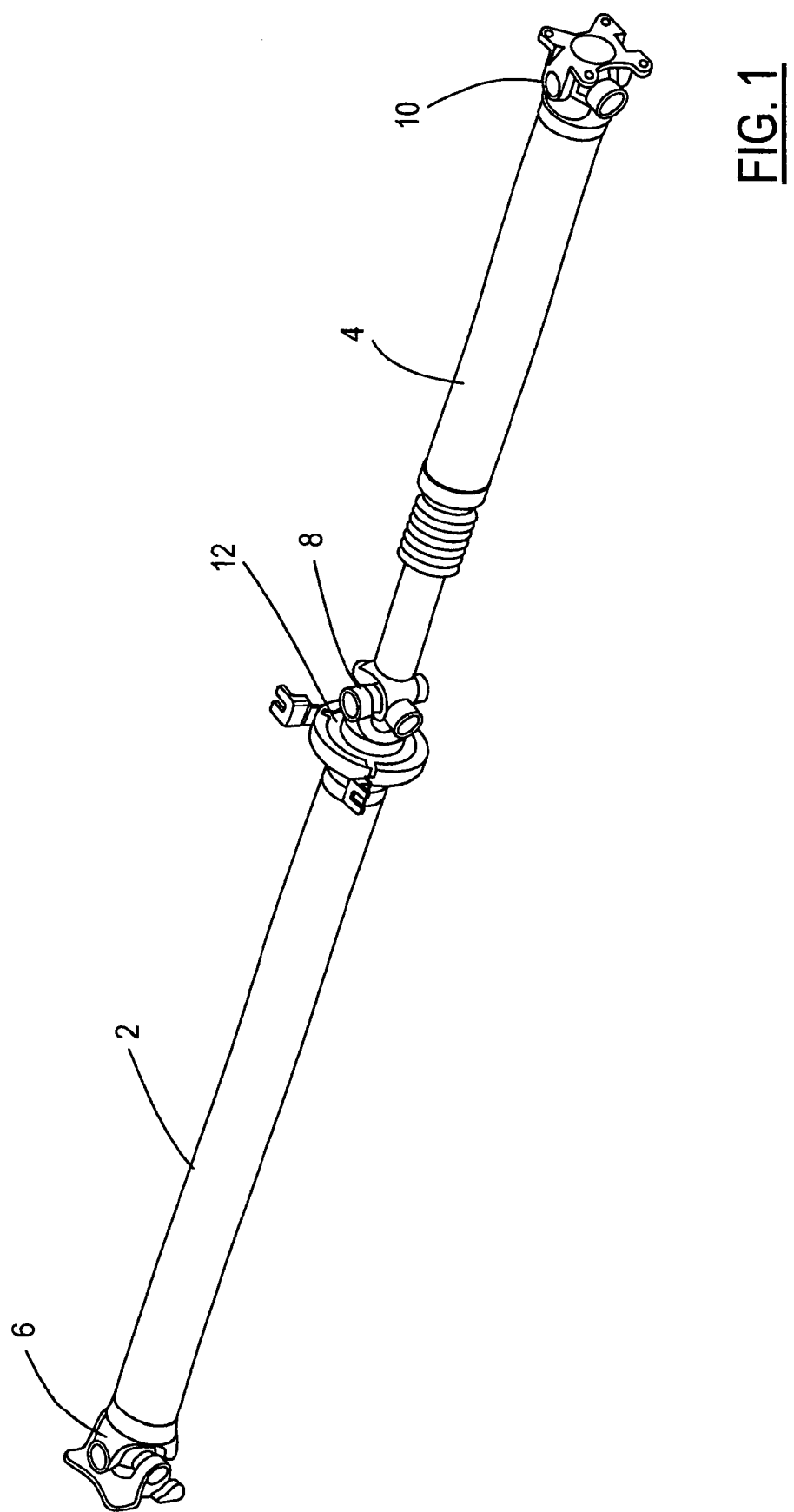
FIG. 1 is a representation of a prior art drive train with a conventional drive shaft support bearing.

A multi-piece driveshaft is represented in FIG. 1 and is typical of the types of driveshafts commonly used in the automotive industry. As shown, a driveshaft support bearing and connecting assembly 12 is associated with a vehicle having a multi-piece driveshaft that includes a first shaft segment or member 12 which is axially coupled by a universal joint 6 to the vehicle's transmission (not shown) and a second shaft segment or member 4 which is operatively and axially coupled to shaft 2 by a universal joint 8 and by universal joint 10 to the vehicle's differential (not shown). Bearing assembly 12 includes a bearing assembly a bracket assembly and a protective cover or shield member shown in FIGS. 2 and 3.

The support drive shaft bearing 101 represented in FIGS. 2 and 3 bears a first embodiment of the present invention. A housing is shown as comprising an upper cover 102 and a lower cover 104. The covers are typically made of preformed (stamped) sheet metal and welded together to form the housing. Brackets 107 and 103 extend from the housing and are used to attach the bearing to the vehicle or the frame of the vehicle to provide support for the bearing. A bearing isolator 108 is captured within the housing and is an annular elastomer formed with spring breaks 111 to allow for flexibility of movement in the bearing through several axes. A bearing retainer sleeve 105 is held within the bearing isolator 108. A bearing assembly 110 is captured within bearing retainer sleeve 105. Bearing assembly 110 comprises an outer race 114, an inner race 112, roller elements 116 and seals 109. Outer race 114 is press fitted within bearing retainer sleeve 105 so as to be retained in the housing.

Bearing retainer sleeve 105 is a cylindrical element with an inwardly folded end to capture outer race 114. Bearing retainer sleeve 105 also has a flared collar 106 that extends axially and outward from the bearing assembly 110.

A first embodiment of a resonant vibration damper assembly of the present invention is shown in FIG. 3 as residing on non-rotating collar 106 of bearing retainer 105. A spring element 120, which is exemplified here as an elastomer material having preselected spring properties, is attached to collar 106. In FIG. 3, collar 106 is represented as having apertures 121 evenly disposed over its circumference. Spring element 120 is formed to have radially and inwardly extending legs 123 that correspond to the locations of apertures 121. Legs 123 are fitted in apertures 121 and provide an attachment of spring element 120 that restricts any tendency for lateral movement or dislocation along the surface of collar 106. A mass element 122, shown here as a cylindrically formed steel ring, is mounted on spring element 120. Mass element 122 and spring element 120 are selected to provide a freely vibrating mass that has a resonant frequency of vibration which corresponds to the frequency of vibration present at the support bearing from the drive train shafts.

In FIGS. 3, 4 and 5, the tuning means includes a steel ring member 124 which is sized to be interference fitted (press fitted) into the central aperture of mass element 122 adjacent spring element 120. In any axial location within mass element 122, ring member 124 contacts spring element 120 to some extent. At each location, spring element 120 experiences different compression forces and therefore different spring characteristics which effect the resonance performance of the damper assembly. I FIG. 5, ring member 124 is shown located inward of mass element 122 more than is indicated in FIG. 4. As such, spring member 120 exhibits some distortion due to additional compression forces caused by the contact with ring member 124 and a rigid annular lip 125 extending from mass element 122.

Figure 6:
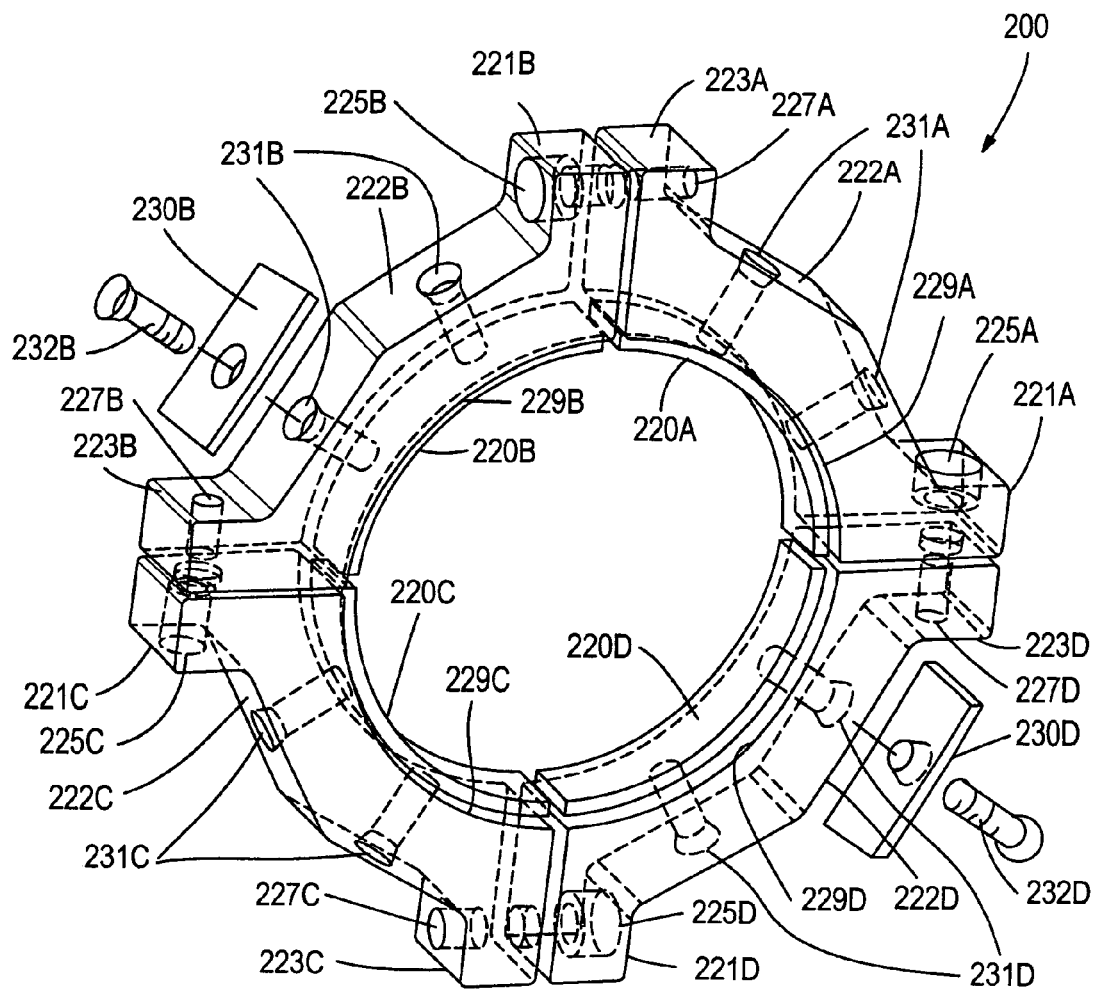
FIG. 6 is a perspective representation of a second embodiment of the present invention.

A second embodiment of the present invention is shown in FIG. 6. In that embodiment, a damper assembly 200 includes a mass element which is made up of a plurality of sub-elements. Together, the sub-elements form a central aperture which encircles one or more spring elements. Each of the arcuate sub-elements 222A-D is identical and is represented as a ninety degree segment. Like each sub-element, sub-element 222A has a pair of connecting flanges. Connecting flanges 221A and 223A respectively contain an open aperture 225A and a threaded aperture 227. When assembled, flange 221A is opposed against flange 223D and flange 223A is opposed against 221B. Screws or similar fasteners (not shown) are inserted into the open and treaded apertures to complete the assembly of the mass element 200.

Spring elements are indicated in the drawing as separate arcuate members associated with each segment of the mass element. In the case of sub-element 222A, it contains an inner arcuate surface 229A. Spring element 220A resides adjacent surface 229A. Likewise, all other sub-elements 222B, 222C and 222D each contain spring elements adjacent their respective inner surfaces 229B, 229C and 229D.

As in the case of the first embodiment, the damper assembly of this second embodiment is configured to be mounted on the non-rotating portion of the bearing assembly and preferably on the flared collar 106 of the bearing retainer sleeve 105 in place of the damper assembly shown in FIG. 3.

This second embodiment has several tuning features that enhance the performance of the damper assembly. A plurality of threaded sockets are disposed evenly and symmetrically on each sub-element and are labeled 231A-D. Each socket is aligned across the center of the damper assembly to be in alignment with a like aperture on an opposing sub-element. Tuning of the resonant vibration frequency of the damper assembly can be changed by symmetrically adding mass to the opposing sub-elements.

This may be achieved by either attaching pairs of opposing screws such as 232B and 232D alone, or to by using screws 232B and 232D to attach additional opposing mass elements such as 230b and 230D. Additional tuning of the damper assembly is achieved by adjusting the torque applied to the screws attaching each flange when the assembly of the sub-elements is made, or thereafter during service. In this manner, the compression forces applied to the spring elements is set and therefore sets the resonant vibration frequency of the mass damper assembly.

Additionally, it has been found that by using different materials for spring elements on opposing sub-elements, the damping mass can be set to have the characteristics of a first resonant frequency of vibration in a first direction transverse to the axis and a second resonant frequency of vibration in a second direction orthogonal to the first direction. In this manner, when a drive shaft exhibits both and horizontal patterns of resonant vibration at different frequencies, this second embodiment can be set to counteract such characteristics and reduce the vibrational effects that would otherwise be transferred to the vehicle.

It should be understood that the foregoing description of the embodiments is merely illustrative of many possible implementations of the present invention and is not intended to be exhaustive.

We claim:

1. A vibration damper assembly for use on a drive shaft bearing in an automotive vehicle which employs a plurality of drive shafts being connected together for rotation about their respective axis adjacent to said bearing, wherein said drive shaft bearing supports said drive shafts on said vehicle and includes a bearing housing that is connectable to said vehicle, an immovable outer race element connected to said housing, an inner race element and a plurality of rotatable bearings captured between said inner and outer races, one of said drive shafts being mountable in said inner race, a cylindrical collar connected to said outer race and extending co-axially therefrom and spaced from contact with said shaft when mounted in said inner race, said vibration damper assembly comprising:
    a circular spring element mounted on said collar; and
    a mass element being suspended on said collar by said spring element to provide counteracting forces to vibrations induced by said mounted drive shaft while it is rotating within said inner race, wherein said spring element is adjustably tuned to provide said damper assembly with a predetermined resonant frequency of vibration characteristic and said assembly further includes a means for selectively presetting the compression forces on the spring element and thereby tuning said damper assembly.

2. A vibration damper assembly as in claim 1, wherein said means for selectively presetting includes an annular ring located between said cylindrical mass element and said spring element.

3. A vibration damper assembly as in claim 2, wherein said annular ring is press fitted to said mass element and is axially moved inwards toward said spring element by a predetermined amount to compress said spring element.

4. A vibration damper assembly as in claim 1, wherein said collar contains a plurality of apertures around its circumference and said spring element is attached to said collar through said apertures.

5. A vibration damper assembly as in claim 4, wherein said spring element is formed as a ring of elastomer material containing a plurality of inwardly extending radial extensions corresponding to said apertures in said collar and sized to be captured and held in place within said apertures when mounted on said collar.

6. A vibration damper assembly as in claim 1, wherein said cylindrical mass element contains an inner aperture sized to incur an interference fit with said spring element.

7. A vibration damper assembly as in claim 1, wherein said cylindrical mass element contains a rigid annular lip sized to incur an interference fit with said spring element.

8. A vibration damper assembly as in claim 1, wherein said spring element is molded in situ between said collar and said cylindrical mass element so as to be mechanically attached thereto.

9. A vibration damper assembly as in claim 1, wherein said spring element is an elastomer ring fitted to the external surface of said cylindrical collar and said cylindrical mass element comprises a plurality of arcuate shaped sub-elements which are secured together to form said mass element with a central aperture that fits around said spring element.

10. A vibration damper assembly as in claim 9, wherein said presetting means is provided by said arcuate shaped sub-elements being secured together to a degree of tightness which compresses said spring element to tune said damper assembly to have a predetermined resonant frequency characteristic.

11. A vibration damper assembly as in claim 10, wherein said sub-elements are adapted to accept the addition of further mass elements to provide further tuning of the resonance of said damper assembly.

12. A vibration damper assembly for use with a drive shaft support bearing in an automotive vehicle which employs a drive shaft that is partially supported on said vehicle for rotation about its longitudinal axis by said drive shaft support bearing, wherein said drive shaft support bearing comprises a housing for attachment to said vehicle, an outer race, an inner race, roller elements captured between said races for allowing free rotation of said inner race with respect to said outer race within said housing, said inner race configured to allow said drive shaft to be fitted therein for rotation about its longitudinal axis, said bearing further including a mass element suspended from said outer race by a spring element coaxial with said races, wherein said mass element and said spring element are selected to have a predetermined resonant frequency of vibration characteristic in opposition to vibrations produced by said drive shaft while rotating within said drive shaft bearing and said assembly includes means for adjusting said resonant frequency of vibration characteristic.

13. A vibration damper assembly as in claim 12, wherein said means for adjusting said resonant frequency includes a means for altering compression forces on said spring element.

14. A vibration damper assembly as in claim 12, wherein said outer race is supported in said housing by an annular cushioning element.

15. A vibration damper assembly as in claim 13, wherein said means for altering compression forces on said spring element includes an annular ring press fitted to said mass element and in contact with said spring element.

16. A vibration damper assembly as in claim 15, wherein the outer edge of said annular ring is set against said spring element by a predetermined amount to compress said spring element and thereby tune said damper assembly.

17. A vibration damper assembly as in claim 12, wherein said bearing includes a rigid cylindrical collar that extends coaxially from said outer race and said spring element is attached to and encircles said collar to suspend said mass element about said collar.

18. A vibration damper assembly as in claim 17, wherein said cylindrical collar contains a plurality of apertures around its circumference and said spring element is attached to said collar through said apertures.

19. A vibration damper assembly as in claim 17, wherein said spring element is an elastomer ring fitted to the external surface of said cylindrical collar and said mass element comprises a plurality of arcuate shaped sub-elements which are secured together to form said mass element with a central aperture that fits around said spring element in a compression mode.

20. A vibration damper assembly as in claim 19, wherein said means for adjusting said resonant frequency of vibration characteristic is provided by said arcuate shaped sub-elements being secured together to a degree of tightness which compresses said spring element to tune said damper assembly to have a predetermined resonant frequency of vibration characteristic.

* * * * *